US007046860B2

(12) United States Patent
Soubelet et al.

(10) Patent No.: US 7,046,860 B2
(45) Date of Patent: May 16, 2006

(54) METHOD FOR SIMULTANEOUS BODY PART DISPLAY

(75) Inventors: Elisabeth Soubelet, Meudon (FR); Sylvie Bothorel, Boulogne-Billancourt (FR); Serge Louis Muller, Guyancourt (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 632 days.

(21) Appl. No.: 10/034,680

(22) Filed: Dec. 19, 2001

(65) Prior Publication Data

US 2002/0090124 A1 Jul. 11, 2002

(30) Foreign Application Priority Data

Dec. 22, 2000 (FR) .................................. 00 16957

(51) Int. Cl.
*G06K 9/32* (2006.01)
(52) U.S. Cl. ......................................... 382/294; 378/37
(58) Field of Classification Search ................ 382/294; 378/37
See application file for complete search history.

(56) References Cited

U.S. PATENT DOCUMENTS

| | | | | |
|---|---|---|---|---|
| 5,572,037 A * | 11/1996 | Liu et al. | ................... | 250/483.1 |
| 5,712,890 A * | 1/1998 | Spivey et al. | ................... | 378/37 |
| 5,832,103 A * | 11/1998 | Giger et al. | ................ | 382/130 |
| 6,035,056 A * | 3/2000 | Karssemeijer | ............... | 382/132 |
| 6,396,940 B1 * | 5/2002 | Carrott et al. | ............... | 382/128 |
| 2001/0002934 A1 * | 6/2001 | Oosawa | ....................... | 382/130 |

FOREIGN PATENT DOCUMENTS

| | | |
|---|---|---|
| EP | 0912963 | 1/1998 |
| EP | 1035507 | 9/2000 |
| EP | 1047018 | 10/2000 |

OTHER PUBLICATIONS

Lou et al, "Full-Field Direct Digital Telemammography: Technical Components, Study Protocols, and Preliminary Results", IEEE Transactions on Information Technology in Biomedicine, vol. 1, No. 4, Dec. 1, 1997 pp. 270-278.
Fei et al, "Mammography Display Station and its Application in a Digital Teaching File", Medical Imaging 1997, vol. 3031, pp. 448-457. Feb. 23-25, 1997.
Fang-Fang et al, "Computerized Detection of Masses in Digital Mammograms: Automated Alignment of Breast Images and its Effect on Bilateral-Subtraction Technique", Medical Physics, vol. 21, No. 3, Mar. 1994 pp. 445-452.
Stamatakis et al, "Detecting Abnormalities on Mammograms by Bilateral Comparison", IEE Colloquium on Digital Mammography, Mar. 27, 1996, pp. 12/1-4.
Brown, "A Survey of Image Registration Techniques", ACM Computing Surveys, vol. 24, No. 4, Dec. 1, 1992, pp. 325-376.

* cited by examiner

*Primary Examiner*—Joseph Mancuso
*Assistant Examiner*—Dennis Rosario
(74) *Attorney, Agent, or Firm*—Cantor Colburn LLP

(57) ABSTRACT

The regions of interest of images of both breasts of a patient are defined as regions of the image of minimal surface area and containing views of the breasts. These regions of interest are aligned for simultaneous display of the images. The display now allows simple and direct comparison of the images of both breasts, notably allowing immediate comparison of structural disorganizations within the two breasts.

19 Claims, 3 Drawing Sheets

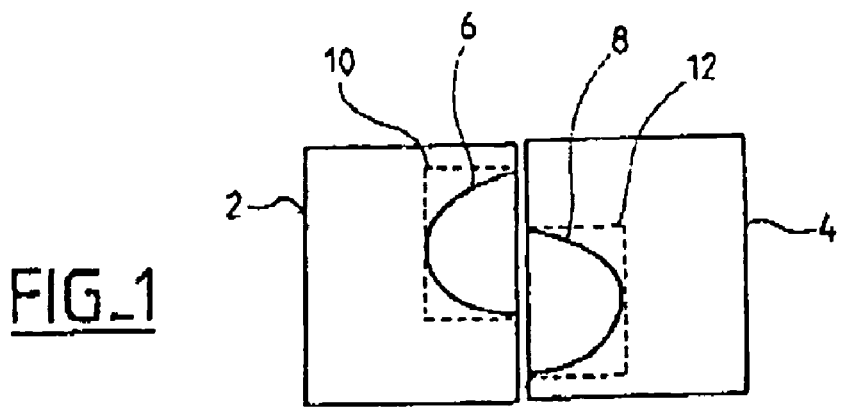
FIG_1
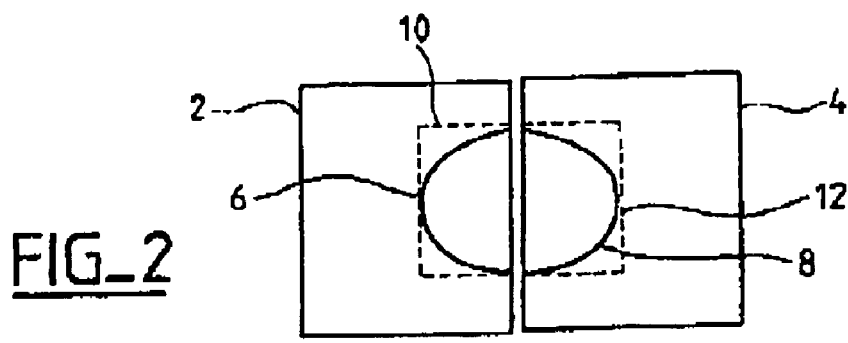
FIG_2
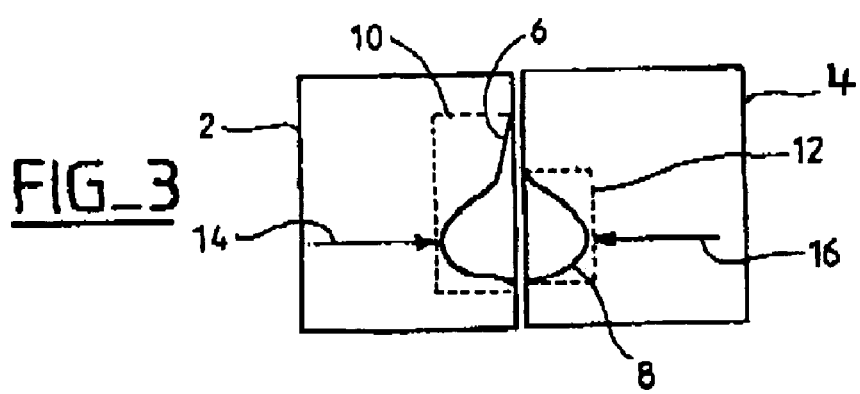
FIG_3
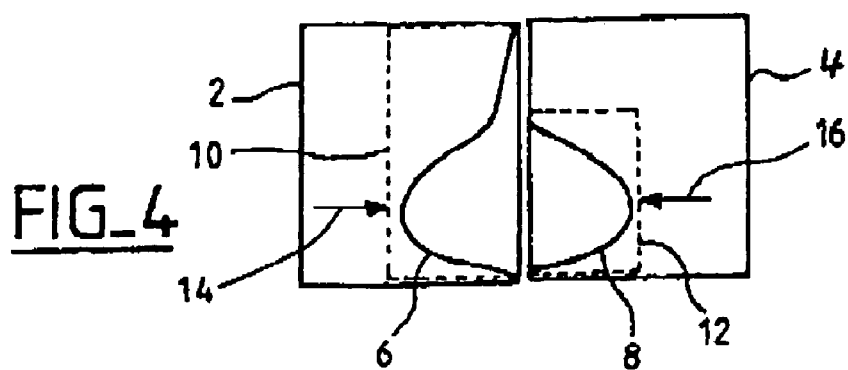
FIG_4

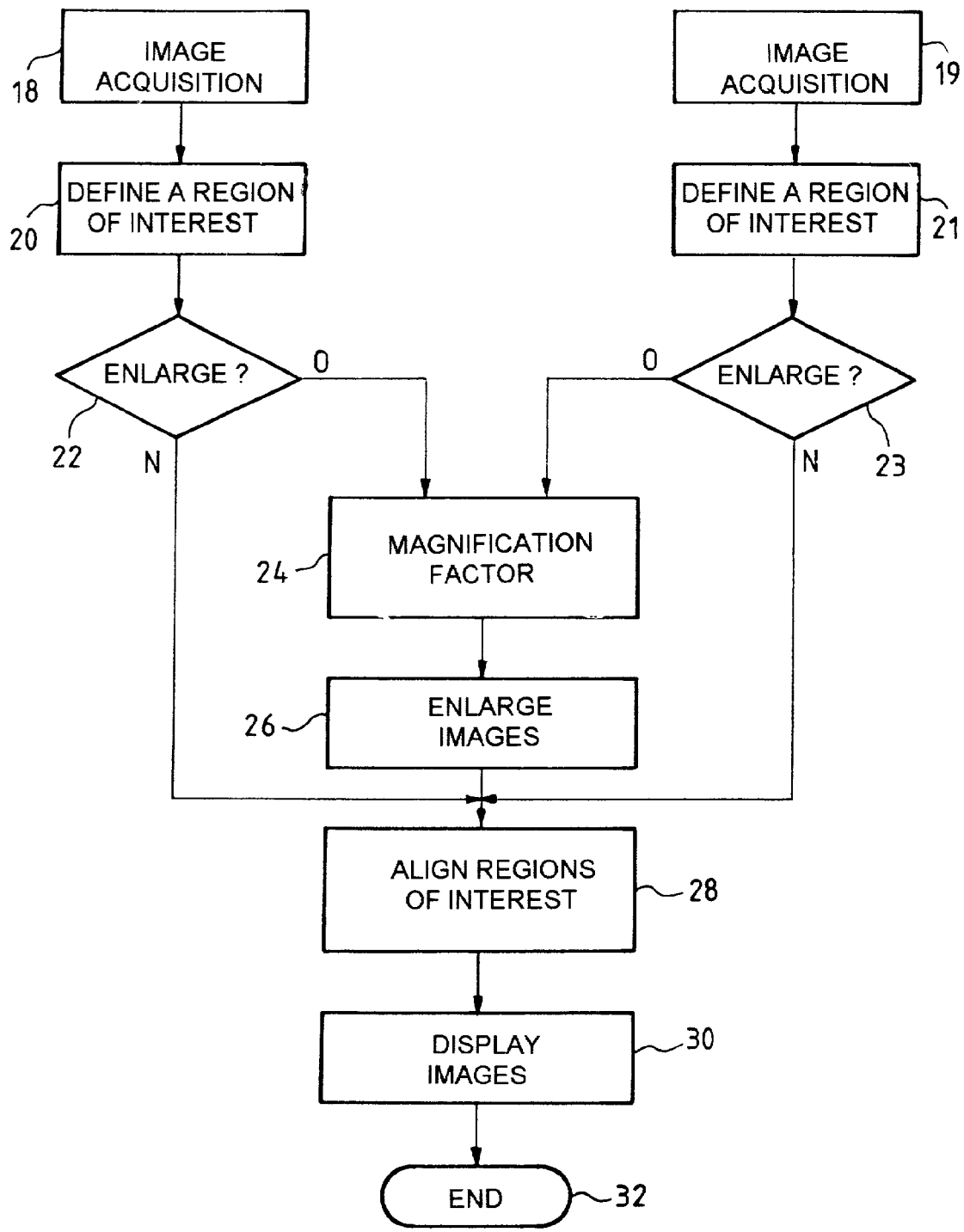

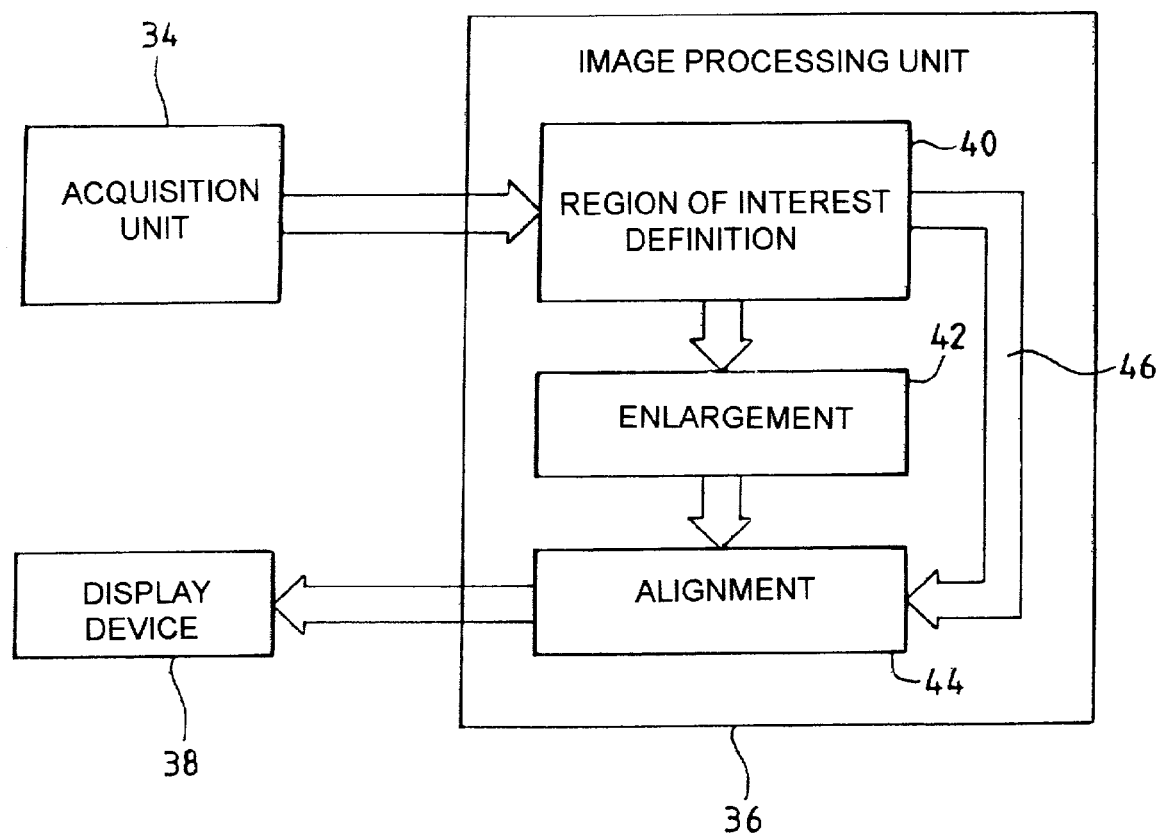

METHOD FOR SIMULTANEOUS BODY PART DISPLAY

CROSS REFERENCE TO RELATED APPLICATIONS

This application claims the benefit of a priority under 35 USC 119 to French Patent Application No. 00 16 957 filed Dec. 22, 2000, the entire contents of which are incorporated by reference.

FIELD OF THE INVENTION

The invention relates to the display of digital images of body parts and more particularly to simultaneous display of the breasts of a patient obtained using mammography apparatus.

BACKGROUND OF THE INVENTION

Mammography apparatus is used for examining patients' breasts using X-rays. The image is acquired using an image receiver formed either by a photographic plate or by digital sensing means. Examinations practiced with such apparatus comprise taking cranio-caudal and lateral images Craniocaudal views are obtained by irradiating the breast from above so as to obtain a view in the axis running from the patient's head to her feet. To obtain a side view, the breast is irradiated from the side so as to obtain a view in an axis passing through the patient's body. In both cases, or for views taken in other directions, it is useful for the practitioner when establishing the diagnosis to compare the images of both of the patient's breasts taken in the same direction. Practitioners often put the films of each breast on the negatoscope side by side in order to compare the images of the two breasts. Comparison notably allows structural disorganization within the breast to be located.

A digital mammograph known as the Senographe 2000D is commercially sold by the assignee of the application. Image display protocols are provided for image display. In certain protocols, the images of both breasts in a given direction are displayed side by side. The mammograph also has a "fit to breast" function. This function allows, for a given image, an enlarged view of a region of interest of the breast to be displayed. This region of interest is constituted by the smallest rectangle of the image that contains the complete breast. Margins are nevertheless provided around the breast. One problem encountered with this apparatus is that display does not necessarily allow ready comparisons of the images of both breasts.

SUMMARY OF THE INVENTION

There is consequently a need for a type of display providing simple and practical comparison of the two images obtained in examination apparatus. This problem is particularly prevalent for images of both breasts obtained in a mammograph.

Briefly, in one embodiment of the present invention, the regions of interest of both images are employed for displaying images on which the regions of interest are aligned. Display of the two images now allows simple and direct comparison of both images. In the case of images of both breasts, the display allows immediate comparison of each breast.

BRIEF DESCRIPTION OF THE DRAWINGS

FIG. 1 shows diagrammatically images of both breasts displayed in a known apparatus;

FIG. 2 shows diagrammatically images of both breasts displayed in one embodiment of the invention;

FIG. 3 shows diagrammatically other images displayed in accordance with an embodiment of the invention;

FIG. 4 shows diagrammatically images displayed according to another embodiment of the invention;

FIG. 5 is a flow chart for an image display method; and

FIG. 6 shows a display apparatus.

DETAILED DESCRIPTION OF THE INVENTION

The embodiments of the invention will be described with reference to its preferred application to the display of digital images of both breasts supplied by mammography apparatus. These images can be images acquired digitally for subsequent digital processing for their display. The images can also be obtained from analog radiography apparatus by exposure and development of films. The analog images can then be digitized and displayed as discussed below.

FIG. 1 shows diagrammatically images 2 and 4 of both breasts displayed in a known apparatus. The first image 2 shows the right-hand breast of a patient in a cranio-caudal view. The second image 4 shows the patient's left-hand breast in a cranio-caudal view. Both images are displayed side by side, the first image being to the left of the second image. The respective contours 6 and 8 of the breasts are shown diagrammatically on their images 2 and 4. On the images 2 and 4, regions of interest 10 and 12 defined around the breasts can also be seen. As explained above, each region of interest is formed by a rectangle surrounding the breast. This rectangle has, taking into account a margin surrounding the breast, a small as possible surface area. In FIG. 1, the views of the breasts on the first and second images are offset. The right-hand breast shown on die first image is higher up than the view of the left-hand breast on the second image. The "height" dimension with reference to FIG. 1 as well as to the remaining drawings refers to a dimension on the images taken along their adjacent edge. Because of the offset, it is difficult for the practitioner to compare the two images. The offset can simply originate from the manner in which each breast was positioned when the images were taken. The offset can also originate from a difference in size of the two breasts.

FIG. 2 shows diagrammatically images of the two breasts displayed according to one embodiment of the invention. As in FIG. 1, the images are two cranio-caudal images, and the same reference numerals have been used to identify the same elements. FIG. 2 also shows the region of interest surrounding the breast on each image; it can be seen that the region of interest is at the same height on each image. In other words, the regions of interest of the left- and right-hand images are aligned. Consequently, as FIG. 2 shows, the two breasts are displayed at the same height on the two images. The right-hand breast shown on the first image 2 is at the same height as the view of the left-hand breast on the second image 4. Such a display facilitates the comparison of the images of both breasts.

The display shown in FIG. 2 can be obtained as follows. Images of both breasts are acquired. As explained above, these may originate directly from apparatus fitted with a digital acquisition unit, or from a unit for digitizing analog images. A region of interest is defined on each image around the view of the patient's breast on the image. Definition of such a region of interest is described in the following European patent applications: EP-A-1,047,018, EP-A-1, 035,507 or EP-A-0,912,963. Definition of such a region of interest is performed on the image using digital image processing techniques. Once the region of interest has been defined on each image, the images are displayed so that the regions of interest are aligned. As FIG. 2 shows, for regions of interest of the same size in the vertical direction, alignment is performed by displaying the upper or lower edge of the regions of interest of the images at the same height.

The digital images can be displayed on the same display apparatus such as a cathode ray tube, a liquid crystal display or any other type of display device. The images can also be displayed on two separate display devices side by side. Whatever type of device is used for display, the two digital images are displayed side by side for comparison purposes wherein the regions of interest are aligned to simplify comparison.

FIG. 3 shows diagrammatically other images displayed according to an embodiment of the invention. The images on FIG. 3 are side view images of a patient's breasts in a mammograph; the same reference numerals have been employed. FIG. 3 shows that the breast shown in the first image 2 is larger than the view of the breast on the second image 4 of FIG. 3. This size difference can simply originate from differing manipulations when taking the images. In the embodiment of FIG. 3, the right-hand breast may have been positioned differently from the left-hand breast when the images were taken. Two arrows 16 and 14 can also be seen on the images 2 and 4 and these indicate the respective positions of the tip of the breast on each image. In the embodiment of FIG. 3, the position of the tip of the breast is used for aligning the regions of interest on the two images. The position of the tip of the breast can be detained using known image analysis techniques. For the alignment, the height in the image of this tip of the breast can simply be used. More generally, where the regions of interest of both images are not of the same size in the vertical direction, one can, for alignment purposes, optimize one image-dependent criterion, as a function of the relative height of the images. Such a criterion can be the result of computing correlation over the whole of the region of interest, or over a part of this region of interest. One could also proceed to correlate images in the area adjoining the tip of the breast. One could also proceed to align the contour of a breast or part of the contour of one breast with respect to the other breast. Such computations allow determination of the relative height for which this criterion is at its maximum; this height now corresponds to alignment of the regions of interest on both images. The result, shown in FIG. 3, is that the images are, like in FIG. 2, displayed so as to facilitate their comparison. The technique described with reference to FIG. 3 is particularly useful when the regions of interest determined for the two images are not of the same size. They are now aligned by calculating an optimization criterion which depends on the relative position of the images, after which this criterion is optimized.

FIG. 4 shows diagrammatically images displayed in another embodiment of the invention. In the embodiment of FIG. 4, not only are the regions of interest aligned, but also the images are enlarged. The same magnification factor is applied to both the images to still ensure ready comparison of each image. The magnification factor is calculated as a function of the size of the region of interest on the first image and the size of the region of interest on the second image. The magnification factor, common to both images is selected so that the region of interest of each image is wholly contained within each displayed image. In other words, the enlargement enables the complete breast to be seen on the image displayed. In the example of FIG. 3, the region of interest on the image of the right-hand breast occupies a greater area than the region of interest on the image of the left-hand breast. The magnification factor to obtain the display shown in FIG. 4 is calculated using the region of interest of the first image. In FIG. 4, the region of interest of the first image consequently touches the upper and lower edges of the image. In contrast, for the same magnification factor, the region of interest of the second image is not touching the edges of the second image. Both images are nevertheless displayed with the same magnification factor which facilitates their comparison. This technique also applies to regions of interest of the same size.

FIG. 5 is a flow chart for carrying out the display method, for the two images. Steps 18–22 concern the first image and steps 19–23 the second image; and steps 24 to 32 constitute joint processing of both images. In a first step 18, the digital image of a breast is acquired. As explained above, acquisition can be of any type. Acquisition can comprise the application of numerous processing operations to the images, for example sensor correction processing operations, and operations for thickness compensation, automatic contrast setting or otherwise. At the next step 20, a region of interest is defined in the image. Next, at step 22, it is determined whether enlargement of the image is desirable. If so, processing passes to step 24 and, in the opposite case, to step 28. Steps 19, 21 and 23 correspond to steps 18, 20 and 22 for the second image. At step 23, like step 22, it is determined whether enlargement of the image is desirable and if so, control passes to step 24 or, in the opposite case, to step 28. Showing the flow chart with two separate branches is simply designed to demonstrate that image processing in these steps is independent. Processing can obviously be performed successively using identical apparatus as would be the case for images taken successively in the same apparatus.

Response at steps 22 and 23 can be pre-programmed for a given display protocol or can result from user input. At step 24, a magnification factor is calculated. This factor is a minimum of the ratio between image size and region of interest size. The minimum on both images, in both directions is considered. The magnification factor obtained will ensure that the region of interest of each image is wholly contained within the enlarged image. At the next step 26, each image is enlarged by applying the calculated magnification factor. Control then passes to step 28 where the two regions of interest are aligned. At step 30, both images are displayed with their regions of interest aligned. The process then stops at step 32. It can obviously be repeated for other images.

FIG. 6 shows image display apparatus. The apparatus has a unit for acquiring digital images 34. This unit is for example an image sensor of digital apparatus, or a unit for digitizing analog images or, yet again, a unit for receiving storage media containing a digital image. The acquisition unit could also be simply comprised of storage media such as a hard disk. The acquisition unit supplies an image processing unit 36 with at least two digital images intended for simultaneous display. Image processing unit 36 processes the images and applies the processed images to a display device 38. As explained above, the display device can be of any type whatsoever. Image processing unit 36 can consist of a PC (personal computer), an image processing board including a microprocessor, or any other digital computing means known per se. This image processing unit comprises several separate processing blocks. These blocks are for example logic blocks in the processing unit. The first block 40 is responsible for defining a region of interest and defines, in each image received, a region of interest and outputs an image having a region of interest. The images supplied are fed to block 42 for enlargement. Block 42 a common magnification factor for the images is calculated; the images are then enlarged. The enlarged images are applied to block 44 handling alignment. As arrow 46 shows, the images with their region of interest can be applied directly to alignment block 44, bypassing the magnification block. In the alignment block, the regions of interest of the images are aligned. The output is aligned images which are applied to display device 38 for simultaneous display. This diagram does not show processing operations which may be applied to the images but which have no bearing on the method described.

Obviously, the invention is not limited to the preferred embodiments discussed above; in particular, it can apply to images other than those of the two breasts in a mammograph; it can also apply to displaying of images of the same breast taken at different moments.

The alignment modes discussed with reference to FIG. 2 for cranio-caudal images also apply to the side views in FIGS. 3 and 4 or, yet again, to any type of image. Inversely, the alignment modes of FIGS. 3 and 4 apply also to images consisting of cranio-caudal images. The region of interest in the example is rectangular but it could have any other shape. In the examples, the enlargement step is performed before the alignment step; but it can also occur after the alignment step. The examples refer to specific images; the method disclosed applies to other images as well. The method has also been described based on an example of two images but it can also apply to more than two images. Thus, two cranio-caudal images could be displayed simultaneously along with two side view images. In this case, the images could be enlarged using the same magnification factor for the four images. The images could also be aligned pairwise. The examples discuss images displayed side by side. The method can also be applied to images displayed one above the other with the dimension of interest no longer being the vertical dimensions, but rather horizontal dimensions.

Various modifications in structure and/or steps and/or function may be made by one skilled in the art without departing from the scope and extent of the invention as recited in the claims.

What is claimed is:

1. A method for displaying digital images of a body part or parts, comprising the steps of:
    defining a region of interest on each image embracing the body part;
    aligning the regions of interest: and
    simultaneously displaying the images with the regions of interest aligned;
    wherein the region of interest is a substantially rectangular region of the image of a minimum surface area to cover the body part
    wherein the images are displayed side by side and in which the alignment comprises the steps of:
    comparing a vertical dimension of the region of interest on each image, and
    if the vertical dimensions are identical, performing vertical alignment of an upper or lower edge of the regions of interest.

2. The method of claim 1, in which the images are images of a patient's breasts.

3. The method of claim 2 wherein the images are displayed side by side, and in which the alignment comprises the steps of:
    comparing a vertical dimension of the region of interest of each image;
    if the vertical dimensions are different, calculating an optimization criterion which is a function of relative image position; and
    aligning the images while maximizing this criterion.

4. The method of claim 3, wherein calculation of an optimization criterion comprises calculating correlation.

5. The method of claim 3, wherein calculation of an optimization criterion comprises aligning body part contours.

6. The method of claim 1 wherein the images are displayed side by side and in which the alignment comprises the steps of:
    comparing a vertical dimension of the region of interest on each image, and
    if the vertical dimensions are identical, performing vertical alignment of an upper or lower edge of the regions of interest.

7. The method of claim 1 wherein the images are displayed side by side, and in which the alignment comprises the steps of:
    comparing a vertical dimension of the region of interest of each image;
    if the vertical dimension are different, calculating an optimization criterion which is a function of relative image position; and
    aligning the images while maximizing this criterion.

8. The method of claim 7, wherein calculation of an optimization criterion comprises calculating correlation.

9. The method of claim 7, wherein calculation of an optimization criterion comprises aligning body part contours.

10. The method of claim 1, wherein the images are displayed side by side, and in which the alignment comprises the steps of:
    comparing a vertical dimension of the region of interest of each image;
    if the vertical dimensions are different, calculating an optimization criterion which is a function of relative image position; and
    aligning the images while maximizing this criterion.

11. The method of claim 10, wherein calculation of an optimization criterion comprises calculating correlation.

12. The method of claim 10, wherein calculation of an optimization criterion comprises aligning body part contours.

13. The method of claim 1 further comprising, prior to the display step, enlargement of the images using a common magnification factor.

14. The method of claim 13, wherein the region of interest of each image after enlargement is contained within the image displayed.

15. A method for displaying digital images of a body part or parts, comprising the steps of;
    defining a region of interest on each image embracing the body part;
    aligning the regions of interest; and
    simultaneously displaying the images side by side with the regions of interest aligned;
    wherein the the aligning comprises the steps of:
    comparing a vertical dimension of the region of interest on each image, and if the vertical dimensions are identical, performing vertical alignment of an upper or lower edge of the regions of interest
wherein the region of interest is a substantially rectangular region of the image of a minimum surface area to cover the body part.

16. The method of claim 15 wherein the region of interest is a rectangular region of the image of a minimum surface area to cover the body part.

17. The method of claim 15, wherein:
the position of a contour tip is used to align the regions of interest on each image.

18. An apparatus for simultaneously displaying digital images of a body part or parts, comprising:
a unit for digital image acquisition;
an image processing unit receiving digital images supplied by the acquisition unit;
a display device for simultaneously displaying digital images processed by the processing unit, wherein the image processing unit comprises:
a substantially rectangular region of interest of a minimum surface area defining block for defining a region of interest on each image embracing the body part; and
an alignment block for aligning the regions of interest of at least two images by comparing a vertical dimension of the region of interest on each image, and if the vertical dimensions are identical, performing vertical alignment of an upper or lower edge of the regions of interest.

19. The apparatus of claim 18, wherein to image processing unit further comprises an enlargement block for enlarging the digital images using the same magnification factor.

* * * * *

UNITED STATES PATENT AND TRADEMARK OFFICE
CERTIFICATE OF CORRECTION

PATENT NO. : 7,046,860 B2
APPLICATION NO. : 10/034680
DATED : May 16, 2006
INVENTOR(S) : Soubelet et al.

It is certified that error appears in the above-identified patent and that said Letters Patent is hereby corrected as shown below:

Column 2:
Line 39, after "on" delete "die" and insert therefor -- the --

Column 3:
Line 35, after "be" delete "detained" and insert therefor -- determined --

Signed and Sealed this

Twenty-seventh Day of February, 2007

JON W. DUDAS
*Director of the United States Patent and Trademark Office*